United States Patent [19]

Stadler

[11] Patent Number: 5,394,135
[45] Date of Patent: Feb. 28, 1995

[54] AUTOMATICALLY ARMED VEHICLE ANTI-THEFT SYSTEM

[76] Inventor: David M. Stadler, 15940 Lauderdale, Birmingham, Mich. 48025

[21] Appl. No.: 990,418

[22] Filed: Dec. 15, 1992

Related U.S. Application Data

[63] Continuation-in-part of Ser. No. 801,701, Dec. 2, 1991, Pat. No. 5,172,094.

[51] Int. Cl.$^6$ .............................................. B60R 25/10
[52] U.S. Cl. ................................... 340/426; 340/428; 340/430; 340/527; 340/528; 307/10.2; 180/287
[58] Field of Search ............... 340/426, 430, 527, 528, 340/428; 307/9.1, 10.1, 10.2; 180/287

[56] References Cited

U.S. PATENT DOCUMENTS 3,978,478  8/1976  Schmitz ........................... 340/528
4,835,518  5/1989  Hwang ............................. 340/528

Primary Examiner—Donnie L. Crosland
Attorney, Agent, or Firm—Lyman R. Lyon

[57] ABSTRACT

A motorized vehicle anti-theft system which is passive by being automatically armed (i.e., does not require a vehicle occupant to set the system). Once power has been turned on to the vehicle, detection of an attempt to start the vehicle motor or the opening of a vehicle door starts a predetermined time cycle. If a first reset signal is not received before the end of the time cycle, a vehicle disabling circuit is set. After that, a detection of actuation of the vehicle brake will cause the disabling circuit to only permit the vehicle engine to operate properly near the engine idling speed, and set off an alarm. Only proper generation of the first and a second reset signal will allow the vehicle to be operated properly again.

12 Claims, 7 Drawing Sheets

AUTOMATICALLY ARMED VEHICLE ANTI-THEFT SYSTEM

CROSS-REFERENCE TO RELATED APPLICATIONS

This application is a continuation-in-part of patent application Ser. No. 07/801,701, filed on Dec. 2, 1991, now U.S. Pat. No. 5,172,094.

BACKGROUND OF THE INVENTION

The present invention generally relates to theft prevention systems and more specifically to a system for preventing the theft of motor vehicles.

Automobile theft has been a fact of life throughout the history of the automobile. Heretofore, most thefts have occurred when the automobile is parked and unoccupied.

A recent phenomenon however, is theft of an automobile from an occupant, at gunpoint. A solution to the automobile theft problem must address this new dimension of car theft. Conventionally, anti-theft systems require an occupant to arm or set the system before a theft can be deterred.

SUMMARY OF THE INVENTION

The present invention solves the above stated problem by providing a vehicle anti-theft system in which actuation of the system does not require any action by an occupant of the vehicle. A basic premise underlying the concept of the present invention is that an occupant is under extreme duress when approached by a thief and therefore incapable or ill advised to perform a physical act to activate an anti-theft system. In accordance with the present invention, the anti-theft system is automatically armed at the end of a predetermined time period if an occupant does not properly deactivate (reset) the system. Once the anti-theft system is armed, the vehicle engine will only be able to properly operate properly near the engine's normal idling speed after a first actuation of the brake pedal. Only proper resetting of both the vehicle disabling circuitry and the anti-theft system will deactivate (reset) the entire system so the vehicle can again be operated normally.

It is therefore an object of the present invention to provide an improved vehicle anti-theft system which is automatically armed in response to a detected condition.

It is another object of the present invention to provide an improved vehicle anti-theft system which disables the vehicle enough to discourage a thief to abandon the vehicle shortly after theft.

It is another object of the present invention to provide a method of passively preventing a theft of a motorized vehicle, wherein the method provides for disabling the vehicle in a manner which only permits the vehicle engine to operate properly near the engine idling speed once the anti-theft system is triggered and there is a detection of vehicle deceleration.

In accordance with the present invention, an automatically armed motorized vehicle anti-theft system comprises a sensor latch means for providing an output signal in response to detection of either an attempt to start the vehicle motor or the opening of a vehicle door, with the engine running, or the ignition key "on" and a timer means having a timer cycle. The timer means is responsive to detection of vehicle power activation and to the sensor latch means output signal for automatically starting the timer cycle. When the timer cycle is complete, the timer means outputs a trigger signal. A means for generating a first reset signal is further provided to reset the sensor latch means and the timer means. A vehicle disabling means is responsive to the trigger signal for only permitting the vehicle engine to operate properly near the engine idling speed in response to detection of a vehicle brake actuation after the receipt of said trigger signal. The system further comprises a means for generating a second reset signal to reset the vehicle disabling means, wherein after the vehicle is disabled, the anti-theft system can only be reset and the vehicle operated normally again by the generation of both the first and second reset signals.

In further accordance with the present invention, a method for passively preventing a theft of a motorized vehicle comprises the steps of detecting power activation of the vehicle, detecting an attempt to start the vehicle motor or open a vehicle door, and in response to both of these steps, automatically initiating a predetermined time cycle. Subsequently, a determination is made concerning whether a first reset signal is generated. If no first reset signal is generated, a trigger signal is generated at the end of the time cycle. The vehicle is disabled so that the vehicle engine will only operate properly near the engine idling speed in response to the first detection of a vehicle brake actuation after the trigger signal has been generated. The method further comprises the step of detecting whether a second reset signal is generated after the vehicle is disabled, and in response to the generation of the second rest signal, the above-described time cycle and disabling step are restarted, wherein once the vehicle is disabled, normal operation can only be achieved after generation of both the first and second reset signals.

The present invention will be more fully understood upon reading the following detailed description of the preferred embodiment in conjunction with the accompanying drawings.

DETAILED DESCRIPTION OF THE PREFERRED EMBODIMENT OF THE INVENTION

Figure 1:
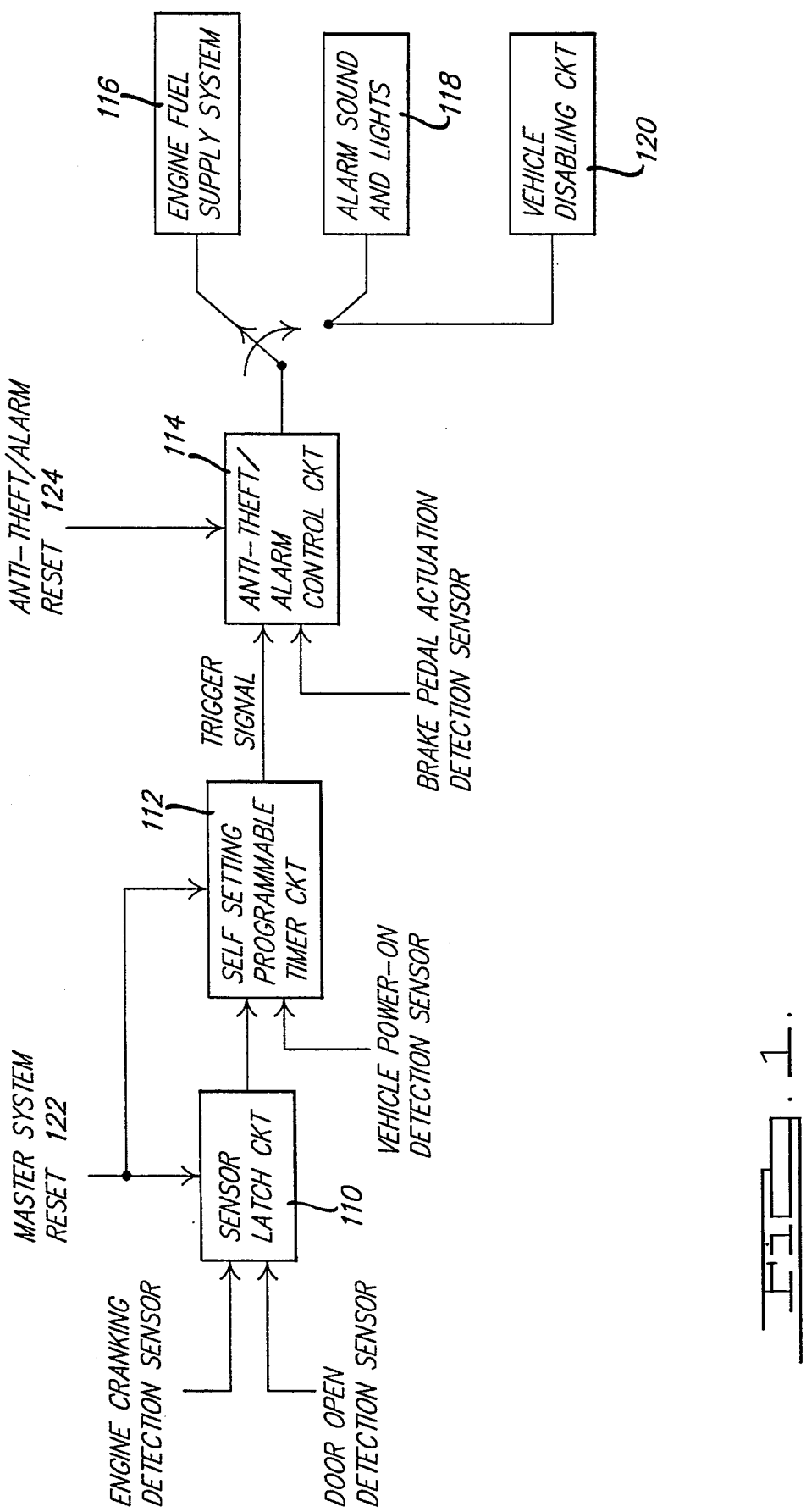
FIG. 1 is a block diagram of the automatically set vehicle anti-theft system according to the present invention.

Referring to FIG. 1 there is shown a general block diagram of the present vehicle anti-theft system. The self-setting programmable timer circuitry 112 operates as a control element for automatically arming the system of the present invention. In operation, timer circuitry 112 is automatically set when vehicle power is activated, e.g., by way of an ignition key. Once the timer circuitry is set, an input signal to timer circuitry 112 from either an engine cranking detection sensor or a door open detection sensor via sensor latch circuitry 110 will start the timer cycle. The timer cycle can be set for any desired length of time. In the preferred embodiment, the timer cycle can be programmed to have a time interval between 30 to 60 seconds.

When the timer circuitry 112 begins its timer cycle, only an input signal from a master system reset 122 can properly deactivate the timer circuitry 112. The generation of the master system reset 122 requires a particular physical action from an occupant in the vehicle. If no master system reset signal is received, the timer circuitry 112 will continue the timer cycle. If power is deactivated and subsequently reactivated (for example, by way of an ignition key), the timer 112 automatically restarts the timer cycle so that merely deactivating vehicle power will not deactivate (reset) the system.

Once the timer circuitry 112 completes the timer cycle, a signal is output to set an anti-theft/alarm control circuitry 114. After being set, the control circuitry 114 is triggered by the next input signal received from a brake pedal actuation sensor. In accordance with the present invention, electrical current will always pass through control circuitry 114 to a vehicle's fuel pump 116 and brake light during normal vehicle operation. When the control circuitry 114 is triggered due to brake pedal actuation, a vehicle disabling circuit 120 is activated to periodically disrupt current to the vehicle fuel pump whenever the vehicle is accelerated. The operation of vehicle disabling circuit 120 is described more fully hereinbelow. Alarm circuitry 118 is also activated by control circuitry 114.

With the present invention, the anti-theft/alarm control circuitry 114 can only be reset by way of an anti-theft/alarm reset signal 124. In the present invention, the reset signal 124 is preferably a personal security code input via a keyboard. Once the control circuit 114 is triggered, the anti-theft system is placed into a "dooms-day" mode. Deactivating vehicle power will not deactivate the anti-theft system. If vehicle power were reactivated, the alarm circuitry 118 would still be activated and the timer circuitry 112 would automatically restart the timer cycle. In this way, even if a thief were to somehow generate the reset signal 124, the timer circuitry 112 would again complete its time cycle so that the control circuit 114 would again be triggered by the next actuation of the brake pedal. Once the system has been triggered, only proper generation of both the anti-theft/alarm reset signal 124 and the master system reset signal 122 can deactivate the anti-theft system.

Figure 2:
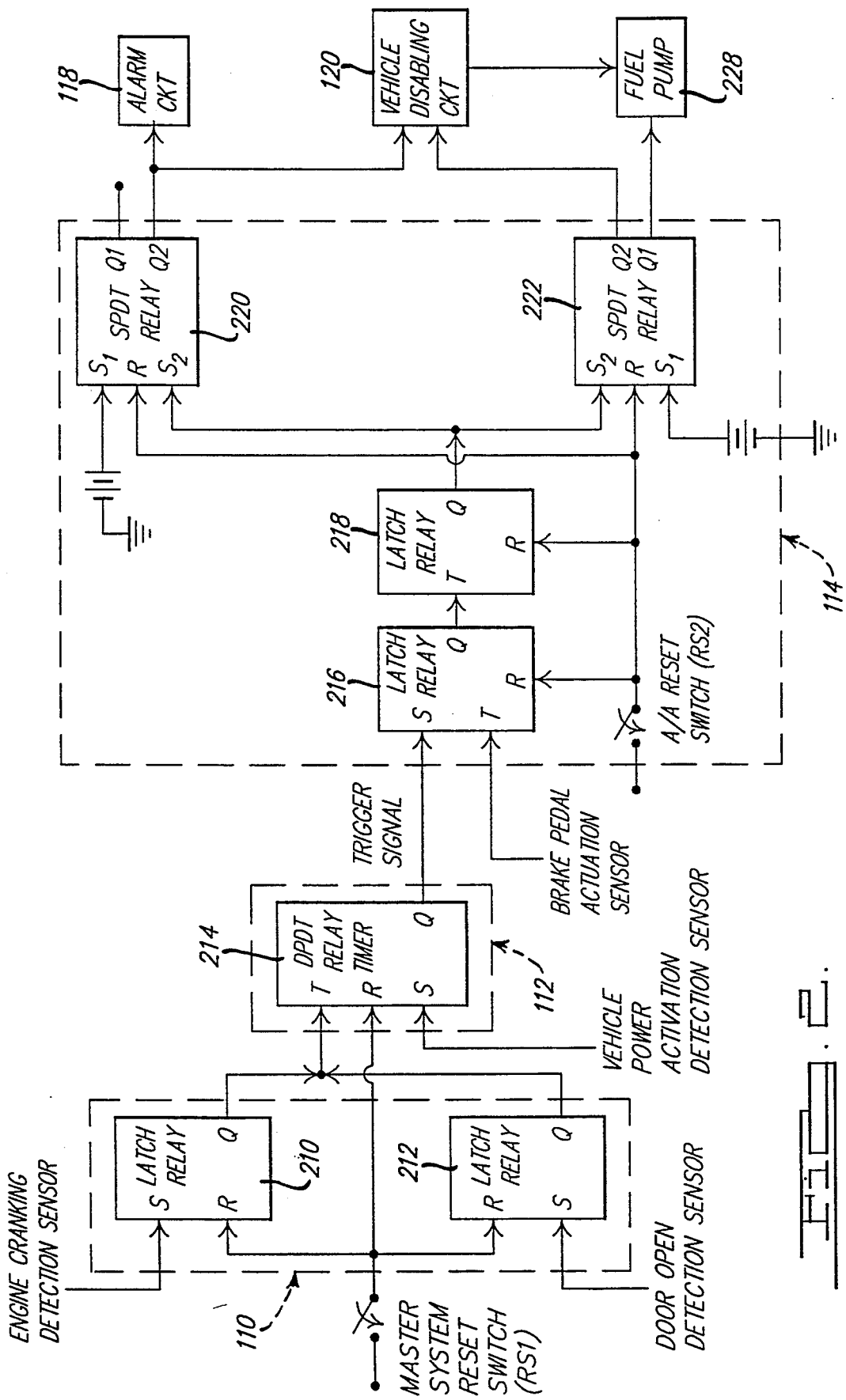
FIG. 2 is a detailed electrical schematic of a first embodiment of the system according to the present invention.

Referring now to FIG. 2 there is shown a circuit diagram for a first embodiment of the anti-theft system according to the present invention. Sensor latch circuitry 110 is comprised of two latch relay units 210 and 212. Latch relay 210 is responsive to an input signal from an engine cranking detection sensor, such as a sensor which detects movement of an ignition key from an instrumentation power mode to an engine ignition mode, and latch relay 212 is responsive to an input signal from an open door detection sensor.

Outputs Q from both latch relays 210 and 212 are connected to a trigger input T of a double-pole/double-throw (DPDT) relay timer unit 214. The timer unit 214 constitutes timer circuitry 112 and has a programmable timer cycle. Timer unit 214 is automatically set when a power-on detection signal is received at an S input. Timer unit 214 and latch relays 210 and 212 can only be reset if a master reset switch RS1 is actuated. In one preferred embodiment, the switch RS1 would be disguised, concealed or hidden somewhere within the vehicle.

Anti-theft/alarm control circuitry 114 is comprised of two latch relay units 216 and 218 and two single-pole/double-throw (SPDT) relay units 220 and 222. When timer unit 214 times out, an electrical current is provided from an output Q to a set input on latch relay 216. Once latch relay 216 is set, any input signal from a brake pedal actuation sensor at T will cause latch relay 216 to output a signal at Q to trigger latch relay 218 at an input T. When latch relay 218 is triggered, an output current is provided at output Q.

Output Q of latch relay 218 is connected to both an input $S_2$ of SPDT relay 220 and an input $S_2$ of SPDT relay 222. Inputs $S_1$ of both SPDT relays 220 and 222 are connected to the vehicle power source. In normal vehicle operation, electrical current flows through SPDT relay 222 from $S_1$ to $Q_1$, thereby allowing the vehicle fuel pump 228 to operate properly. In accordance with the present invention, the output $Q_1$ of SPDT relay 220 is not connected to any other circuit element.

SPDT relay 220 functions as a switch such that when an output signal from latch relay 218 is received at $S_2$, SPDT relay 220 switches electrical current to the alarm circuit 118 and the vehicle disabling circuit 120 via output $Q_2$. SPDT relay 222 operates simultaneously to switch flow of electrical current from the vehicle fuel pump 228 to vehicle disabling circuit 120. Once the anti-theft system has been triggered, latch relays 216/218 and SPDT relays 220/222 can only be reset by actuation of an anti-theft/alarm reset switch RS2. In one preferred embodiment, switch RS2 is implemented by using a special security code input by way of a keyboard. It will be appreciated that switch RS2 can also be implemented by using a concealed or hidden switch.

In a preferred implementation of the circuit shown in FIG. 2, the following commercially available circuit elements or equivalents can be used: for latch relays 210, 212, 216 and 218 a Potter & Brumfield T83 series DPDT dual coil latching PC board relay; for SPDT relays 220 and 222 a Potter & Brumfield T91 series SPDT spring biased 30 amp panel mount relay; and for DPDT relay timer 214 a Potter & Brumfield CD series CMOS IC time delay relay. Alternatively, suitable digital circuitry can be used.

In accordance with the present invention, timer unit 214 automatically sets itself and is triggered to start the timer cycle whenever the timer unit 214 receives a signal from latch relay 210 or 212. Once the timer cycle is started, the timer unit 214 can only be deactivated (reset) by the receipt of the master system reset signal from switch RS1. Removing power from timer unit 214 without resetting latch relay 210 or 212 will only keep restarting the timer cycle whenever the system subsequently detects power reactivation.

It is also noted that once the vehicle becomes disabled by the present invention, normal operation can only be realized after switches RS2 and RS1 have been actuated. For example, merely actuating switch RS2 will not reset the timer unit 214. The next time the brake pedal is depressed, the vehicle will be disabled again.

Figure 3:
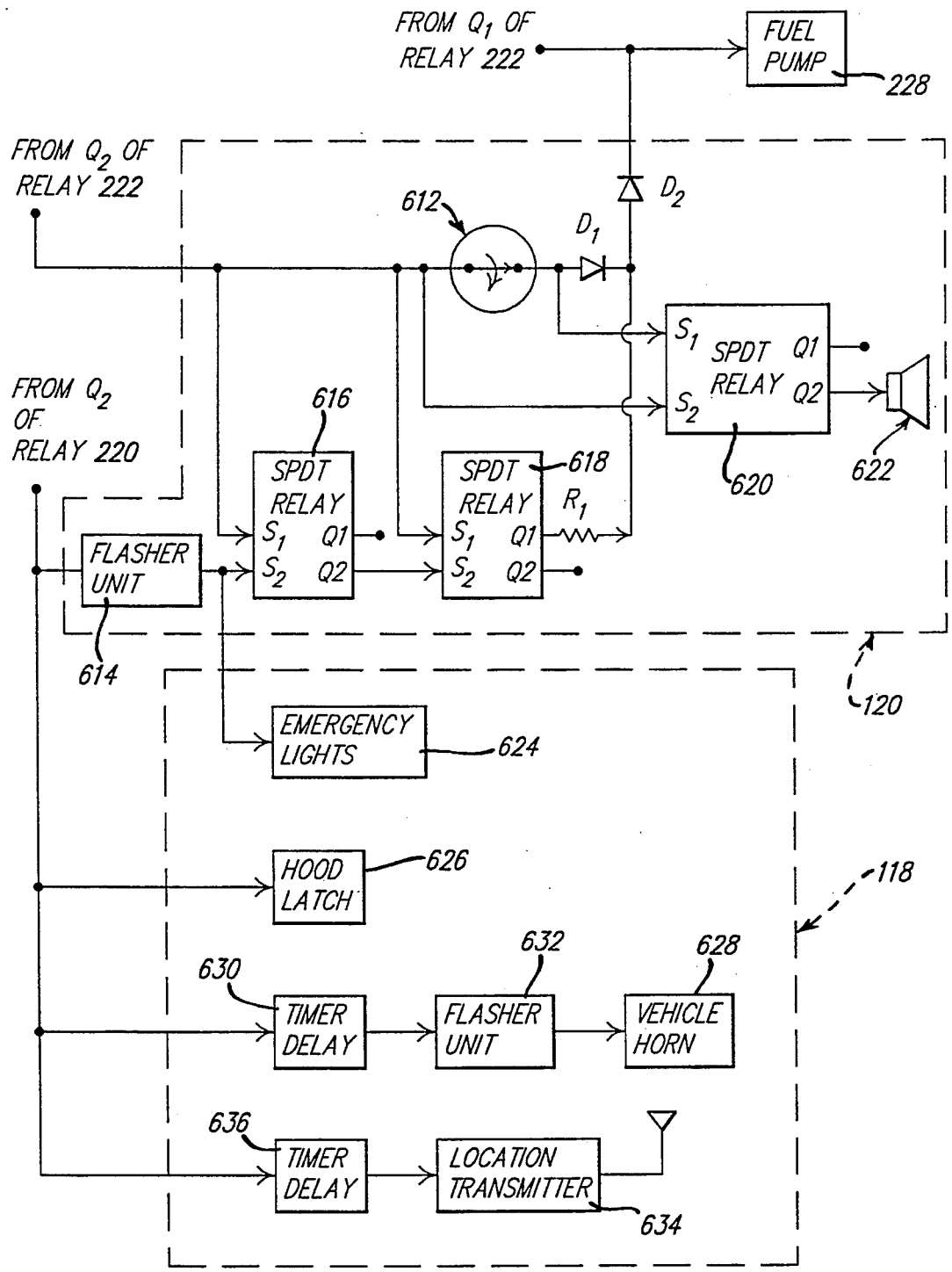
FIG. 3 is a detailed electrical schematic of the vehicle disabling circuit shown in FIGS. 1 and 2.

Referring now to FIG. 3, the vehicle disabling circuit 120 is shown in more detail. When the output of SPDT relay switch 222 is switched from $Q_1$ to $Q_2$, the electrical current flowing to the fuel pump 228 is shunted to an x terminal of a vacuum switch 612 connected to the manifold of the vehicle engine. The manifold vacuum switch 612 is a normally closed switch which automatically opens when the pressure in the engine manifold drops to a predetermined level. The drop in manifold pressure is responsive to the driver depressing the vehicle accelerator pedal. A y terminal of the vacuum switch 612 is connected through a diode $D_1$ and diode $D_2$ to the fuel pump 228. Thus, when the vehicle engine is at, or near normal idling speed, a steady flow of electrical current passes through vacuum switch 612 to power the fuel pump 228, and when the vehicle accelerator pedal is depressed, vacuum switch 612 opens to cutoff current flow to the fuel pump.

However, with the above arrangement, the vehicle would become completely disabled when the accelerator pedal is depressed, thereby creating a potentially hazardous situation due to the vehicle stopping in the middle of traffic. Thus, a second parallel electrical current path is provided through a flasher unit 614, SPDT relay 616, SPDT relay 618, and resistor $R_1$ to intermittently supply electrical current to the fuel pump 228. More specifically, the flasher unit 614 generates a series of pulses in response to receiving an electrical current from the $Q_2$ output of SPDT relay 220. The series of pulses are supplied to an $S_2$ input of SPDT relay 616 as a set of trigger pulses. SPDT relay 616 also receives at an $S_1$ input an energizing current from the $Q_2$ output of SPDT relay 222, so that SPDT relay 616 Q output produces a series of pulses which correspond to the flasher unit 614 pulses whenever SPDT relay 616 is energized.

The series of pulses produced by SPDT relay 616 are supplied to an $S_1$ input of SPDT relay 618 as an intermittent energizing pulse. Electrical current from the $Q_2$ output of SPDT relay 222 is also provided to an $S_2$ input of SPDT relay 618, thereby causing the relay 618 to toggle the output connection between $Q_1$, which is connected to the fuel pump 228 through a resistor $R_1$, and $Q_2$ which remains unconnected. Thus, when the vehicle's accelerator pedal is depressed, the manifold vacuum switch 612 automatically opens and an intermittent electrical current is supplied to the fuel pump 228 causing the vehicle to violently jerk as the fuel supply to the engine is repetitively turned on and off. Resistor $R_1$ is selected to determine the maximum attainable engine speed. When the accelerator pedal is released, the engine returns to idling speed thereby causing the manifold pressure to increase and automatically close vacuum switch 612. The closing of vacuum switch 612 permits a steady flow of electrical current to the fuel pump thereby allowing the engine to operate normally.

In addition to intermittently supplying current to the fuel pump 228, the present invention further triggers a high decibel audible alarm device 622 located within the interior of the vehicle whenever the vacuum switch 612 is in an open state. Referring again to FIG. 3, an $S_2$ and $S_1$ input of a SPDT relay 620 are respectively connected in parallel with the x and y terminals of the vacuum switch 612. Thus, when vacuum switch 612 opens, an electrical current path is created in SPDT relay 620 to cause the output to switch from an unconnected output $Q_1$, to an output $Q_2$ connected to the high decibel audible alarm 622.

With the above described arrangement, the vehicle disabling circuit 120 of the present invention only permits the vehicle engine to operate properly near the engine idling speed. The violent lurching of the vehicle coupled with the piercing audible alarm 622 will effectively cause a thief to abandon the vehicle, and the ability to have a limited control of the vehicle will allow the thief to safely pull out of traffic before abandoning the vehicle.

In further accordance with the present invention, the $Q_2$ output of relay 220 activates the alarm circuitry 118. As shown in FIG. 3, the flasher unit 614 causes the vehicle's four-way emergency lights 624 to blink, a hood latch 626 is activated to prevent access to the vehicle engine compartment, and the vehicle horn 628 is activated through a timer delay unit 630 and a flasher unit 632. The flasher unit 632 repetitively sounds the horn 628, and the timer delay unit 630 automatically turns off the horn 628 after a predetermined time period, such as five minutes, to prevent draining of the vehicle battery. Also, an optional location beacon transmitter 634 can be activated after a predetermined time delay set by a timer delay unit 636. The optional location transmitter 634 transmits a radio beacon signal which can be tracked by a separate tracking receiver (not shown), thereby facilitating recovery of the stolen vehicle.

Figure 4:
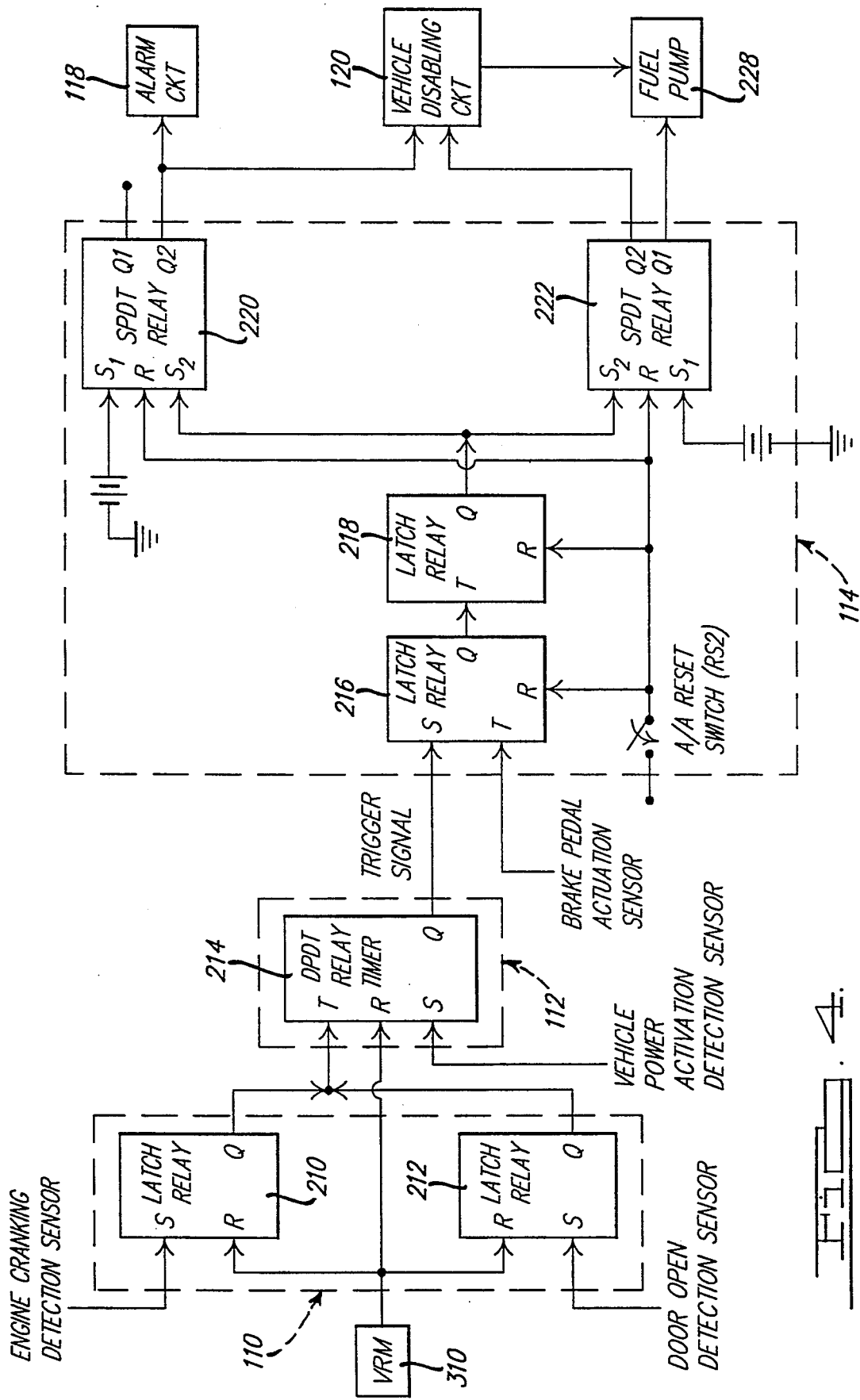
FIG. 4 is a detailed schematic of a second embodiment of the system according to the present invention.

Referring now to FIG. 4 there is shown a circuit diagram for a second embodiment of the anti-theft system according to the present invention. Elements which are identical to those in FIG. 2 have like numerals, and their operation has been previously described in context with FIG. 2.

The system shown in FIG. 4 has replaced the concealed master system reset switch with a voice recognition microprocessor (VRM) or speech recognition microprocessor (SRM) 310. The present embodiment illustrates a VRM, but an SRM is equally applicable. The VRM 310 provides a more secure and easier way of deactivating (resetting) the anti-theft system of the present invention. VRM 310 could be set to recognize a single voice or command word, or a plurality of voices and command words. The operation of the circuit shown in FIG. 4 is identical to that in FIG. 2.

Figure 5:
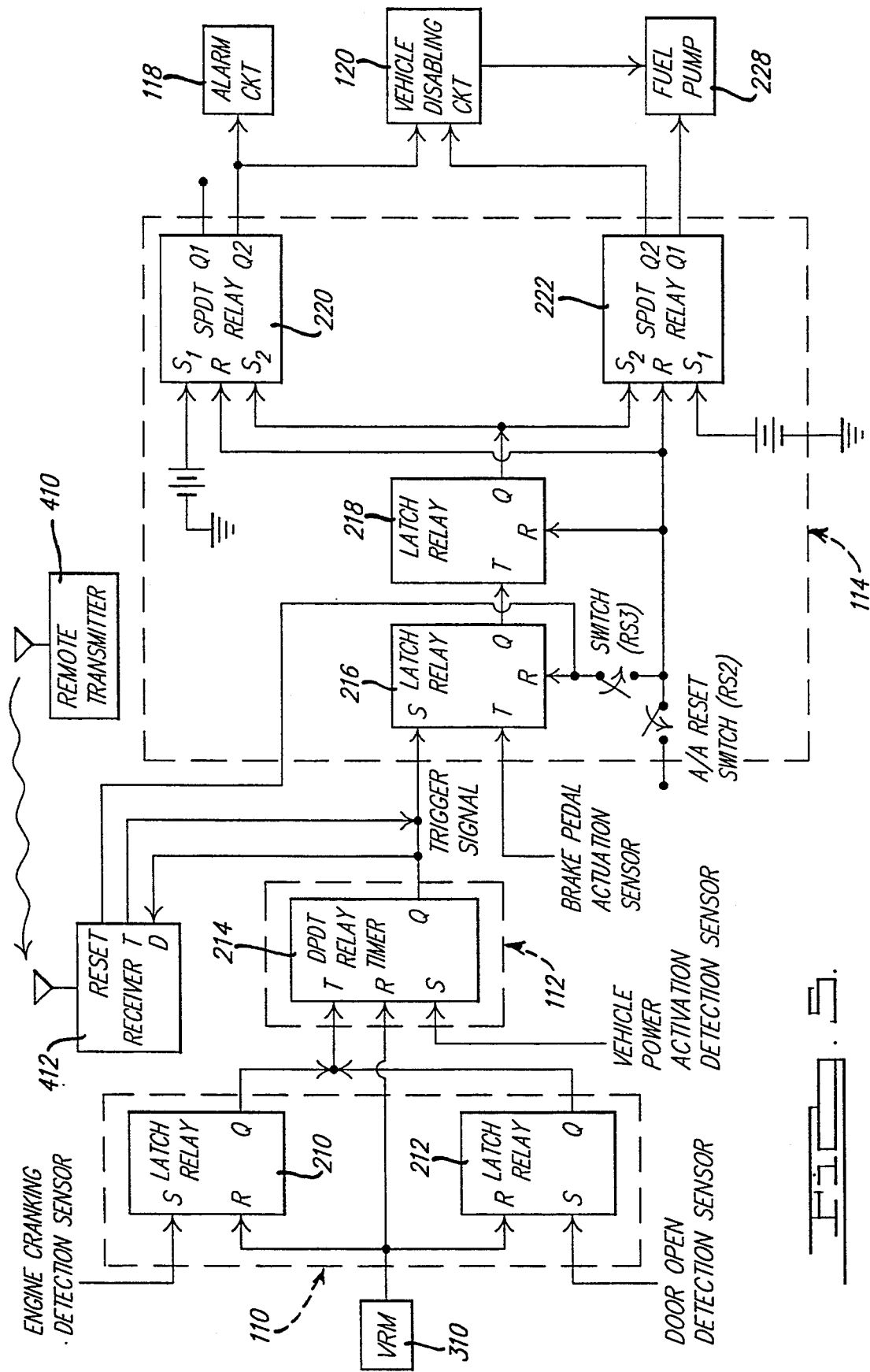
FIG. 5 is a detailed schematic of a third embodiment of the system according to the present invention.

Referring now to FIG. 5 there is shown a circuit diagram for a third embodiment of the present invention. Elements which are identical to those in FIGS. 2 and 4 have like numerals and their operation has been previously described in context with FIGS. 2 and 4.

The system shown in FIG. 5 is further provided with a small activating transmitter 410 and receiver 412. Transmitter 410, for example, can be located on a key chain carried by the vehicle owner. With transmitter 410, a person can remotely activate the anti-theft system of the present invention. Receiver 412 receives an activate signal from transmitter 410 and generates an output signal to $S_2$ of latch relay 216. In this manner, the timer unit 214 is bypassed and the system can be immediately set. The receiver 412 also receives a deactivate signal and generates a reset signal to reset latch relay 216. This embodiment would be particularly suited to an armored car. Guards outside the vehicle could then activate the anti-theft system via transmitter 410 immediately upon occurrence of a theft. A transmitter/receiver could be selected to provide a reception range of up to 500 feet.

In the operation of the circuit of FIG. 5, the present invention further provides for the output Q of timer unit 214 to disable receiver 412 via input D in addition to setting latch relay 216. In this way, when the timer cycle has completed, receiver 412 will not be able to reset latch relay 216 because transmissions cannot be received until the entire system is reset.

Also note the use of switch RS3 located between the reset of latch relay 216 and the reset of latch relay 218. The switch RS3 prevents receiver 412 from ever being able to reset latch 218 unless closed. In this way, an unauthorized user cannot deactivate the anti-theft system by means of remote transmitter 410 before the timer 214 can disable the receiver 412. Latch relay 216 can only be reset by the simultaneous activation of switch RS2 and switch RS3 after the timer cycle has completed. Switch RS3 could be disguised or concealed in the vehicle.

Figure 6:
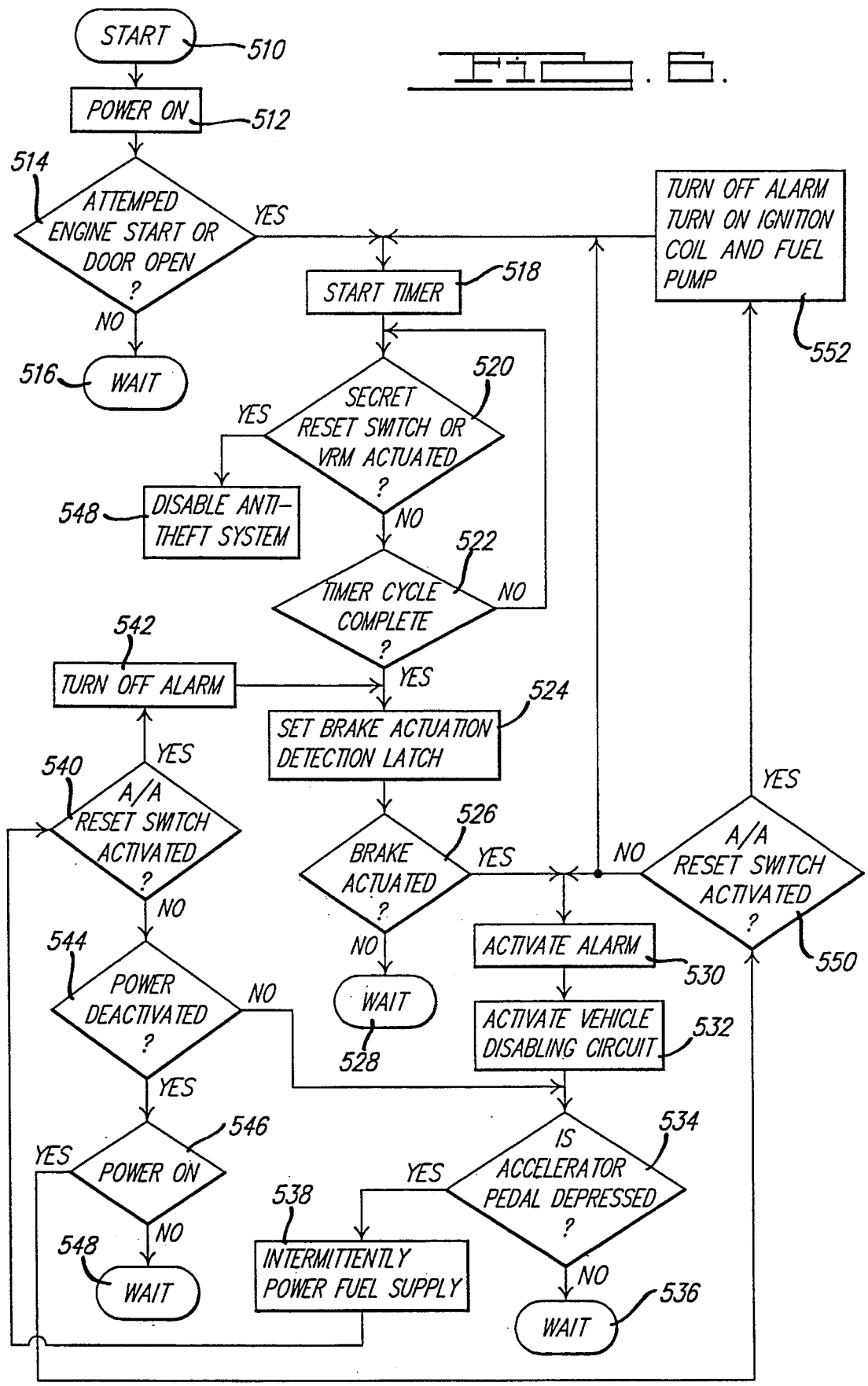
FIG. 6 is a flow chart illustrating the operation of the system according to the present invention.

Referring now to FIG. 6 there is shown a flow chart illustrating the basic operation of the anti-theft system according to the present invention. First, the system determines that power has been turned on in the vehicle 512. Once power is turned on, the system determines if there is an attempt to start the engine, or a door is opened 514. If there is no detection, the system waits 516. If there is a detection, the system will automatically start the timer (518).

Once the timer is started, the system will determine if the master system reset switch or VRM have been properly actuated. If so, the anti-theft system is deactivated or disabled 548. If not, the system checks to see if the timer cycle has been completed 522. If not, the system will keep checking for proper receipt of the master system reset signal.

Once the timer cycle is complete, the system will set the brake pedal actuation detection latch 524. If there is detection of brake pedal actuation, the system then actuates an alarm 530, and activates the vehicle disabling circuit 532. If brake pedal actuation is not detected, the system just waits 528. After the vehicle disabling circuit is activated, the system determines if the vehicle accelerator pedal has been depressed 534, and in response thereto intermittently powers the fuel supply 538 if the accelerator pedal is depressed, or just waits 536.

Subsequently, the system then determines if the anti-theft/alarm system reset switch has been actuated 540. If so, the system deactivates the alarm and vehicle disabling circuit 542, but resets the brake pedal actuation detection latch 524. If the anti-theft/alarm system reset switch has not been actuated, the system determines if vehicle power has been deactivated 544. If not, the car remains disabled with the system continuously checking for the anti-theft/alarm system reset signal.

If power is deactivated, the system then determines if power is reactivated 546. If not, the system just waits 548. If power is reactivated, then the system determines if the anti-theft/alarm system reset switch has been actuated 550. If not, the motorized vehicle remains disabled with the alarm actuated 530 and 532. The system also restarts the timer 518. If the anti-theft/alarm system reset switch has been actuated, the system then turns off the alarm/turns on the fuel supply system and ignition system 552 and restarts the timer 518. The whole process is continually repeated until the master system reset switch or VRM are properly actuated.

Figure 7:
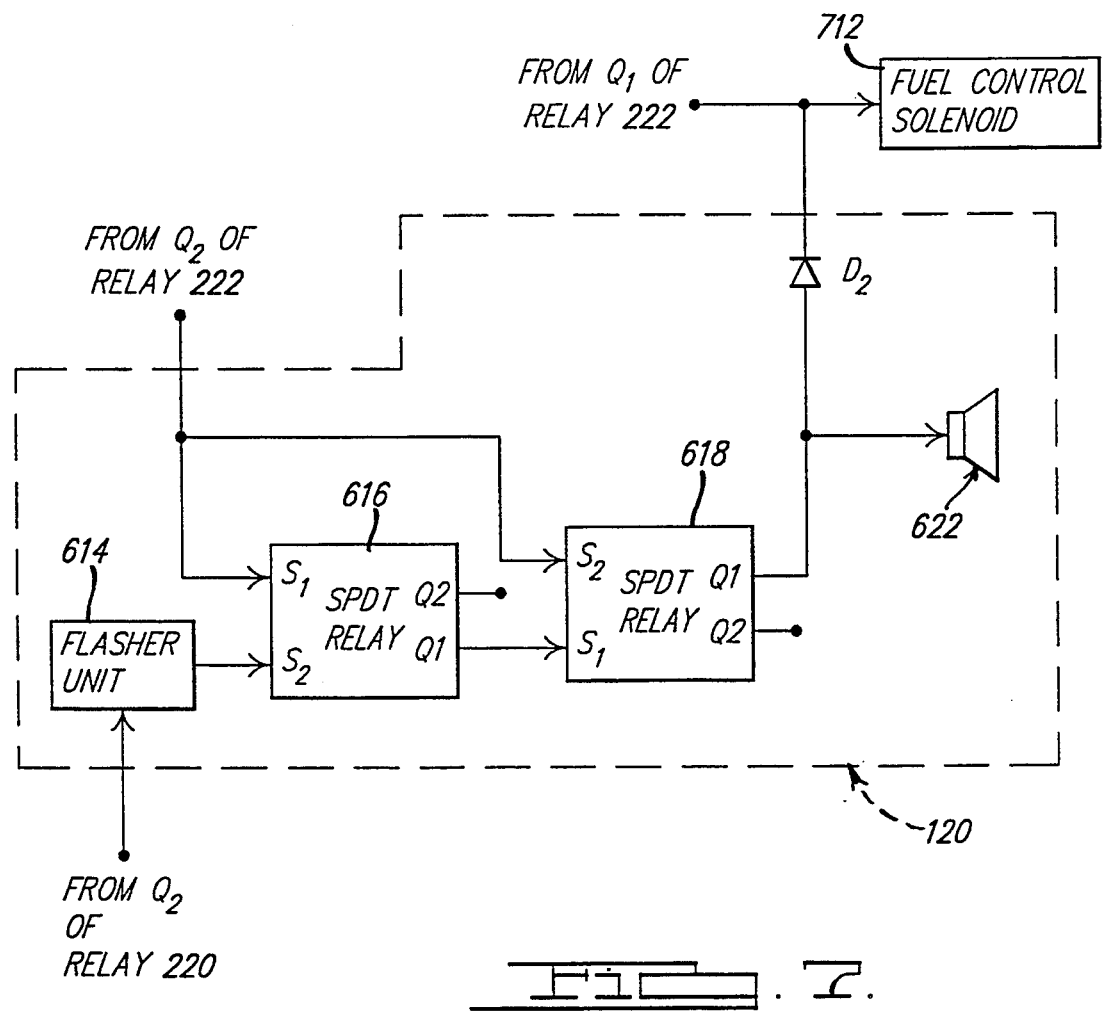
FIG. 7 is a detailed electrical schematic of the vehicle disabling circuit modified for use with a diesel engine.

Referring now to FIG. 7, the vehicle disabling circuit 120 of FIG. 3 is shown as modified for use with a motor vehicle having a diesel engine. In this arrangement, the manifold vacuum switch 612 has been removed, and the $Q_1$ output of SPDT relay is directly connected to a fuel control solenoid 712, on the diesel engine and the audible alarm 622. Thus, upon activation of the vehicle disabling circuit 120, operation of a diesel engine will be periodically interrupted and the piercing alarm generated, even when the engine is operating at idling speed.

It will be appreciated that other modifications can be made in accordance with the present invention. For example, an acceleration sensor, or accelerometer, can be used in place of a brake pedal actuation sensor for detecting deceleration of the vehicle. Further, electrical current to the vehicle's ignition coil(s) could be interrupted instead of the fuel pump. An optional valet switch can also be connected to the Q outputs of both latch relays 210 and 212. The valet switch would permit temporary override of the anti-theft system of the present invention by preventing signals from the door open detection sensor, or the engine cranking detection sensor from triggering the start of the timer unit 214. It will also be understood that the foregoing description of the preferred embodiments of the present invention is for illustrative purposes only, and that the various structural and operational features herein disclosed are susceptible to a number of modifications and changes none of which departs from the spirit and scope of the present invention as defined in the appended claims.

I claim:

1. An automatically armed motorized vehicle anti-theft system comprising:
   a sensor latch means for providing an output signal in response to detection of either an attempt to start the vehicle motor or the opening of a vehicle door;
   an electrical power detection means for providing an output signal in response to activation of vehicle electrical power;
   a timer means having a timer cycle, said timer means automatically starting the timer cycle in response to said sensor latch means output signal and said electrical power detection means output signal, wherein when the timer cycle is complete, said timer means outputs a trigger signal;
   means for generating a first reset signal to reset said sensor latch means and said timer means; and
   a vehicle disabling means which is responsive to said trigger signal and a signal indicative of a vehicle brake actuation for only permitting the vehicle engine to operate properly near an engine idling speed in response to detection of a vehicle brake actuation after the receipt of said trigger signal.

2. The system of claim 1 further comprising a means for generating a second reset signal to reset said vehicle disabling means, wherein after the vehicle is disabled, said anti-theft system can only be reset and the vehicle operated normally again by the generation of both said first and said second reset signals.

3. The system of claim 1 wherein said vehicle disabling means comprises a vacuum switch connected to the vehicle engine manifold and fuel pump, said vacuum switch being responsive to engine manifold pressure which decreases in response to an increase in engine speed, wherein said vacuum switch is closed to provide electrical current to the fuel pump when the engine is operating near a normal idling speed, and open to disrupt electrical current to the fuel pump when the engine manifold pressure decreases to a predetermined level.

4. The system of claim 3 further comprising a means for periodically supplying electrical current to the fuel pump when the vacuum switch is open.

5. The system of claim 1 wherein only said first reset signal prevents the generating of said trigger signal when received by said timer means before completion of said timer cycle.

6. The system of claim 1 wherein said vehicle disabling means further actuates a high decibel audible alarm inside the vehicle when the vehicle is disabled.

7. The system of claim 1 wherein said first reset signal generating means comprises a voice or speech recognition means which generates said first reset signal in response to detecting an authorized voice or speech input.

8. The system of claim 1 wherein said vehicle disabling means further actuates a location tracking transmitter means when said vehicle is disabled so that the location of said disabled vehicle can be determined.

9. A method for passively preventing a theft of a motorized vehicle comprising the steps of:
  a) detecting activation of the vehicle's electrical power;
  b) detecting an attempt to start the vehicle motor or open a vehicle door;
  c) in response to both steps a) and b), automatically initiating a predetermined time cycle;
  d) detecting whether a first reset signal is generated;
  e) generating a trigger signal at the end of said time cycle if the first reset signal has not been generated;
  f) detecting actuation of a vehicle brake; and
  g) disabling the vehicle so that the vehicle engine will only operate properly near an engine idling speed in response to the first detection of vehicle brake actuation after said trigger signal has been generated.

10. The method of claim 9 further comprising the step of detecting whether a second reset signal is generated after the vehicle is disabled, and in response to the generation of said second reset signal, restarting said time cycle and repeating steps f) and g), wherein only generation of both said first and said second reset signals will again permit normal operation of the vehicle.

11. The method of claim 9 wherein step g) further comprises the step of actuating a high decibel alarm inside the vehicle when the vehicle is disabled.

12. The method of claim 9 wherein said first reset signal is generated by a voice or speech recognition means.

* * * * *

UNITED STATES PATENT AND TRADEMARK OFFICE
CERTIFICATE OF CORRECTION

PATENT NO. : 5,394,135
DATED : February 28, 1995
INVENTOR(S) : David M. Stadler

It is certified that error appears in the above-identified patent and that said Letters Patent is hereby corrected as shown below:

```
Col. 1, line 39, delete "properly" (first occurrence).
Col. 1, line 51, delete "discourage" and insert --encourage--.
Col. 2, line 32, delete "rest" and insert --reset--.
```

Signed and Sealed this

Sixteenth Day of May, 1995

Attest:

BRUCE LEHMAN

*Attesting Officer*     *Commissioner of Patents and Trademarks*